April 22, 1952 W. P. RUSSELL 2,593,799
TOOL FOR CLEANING GREASE FITTINGS
Filed April 21, 1949
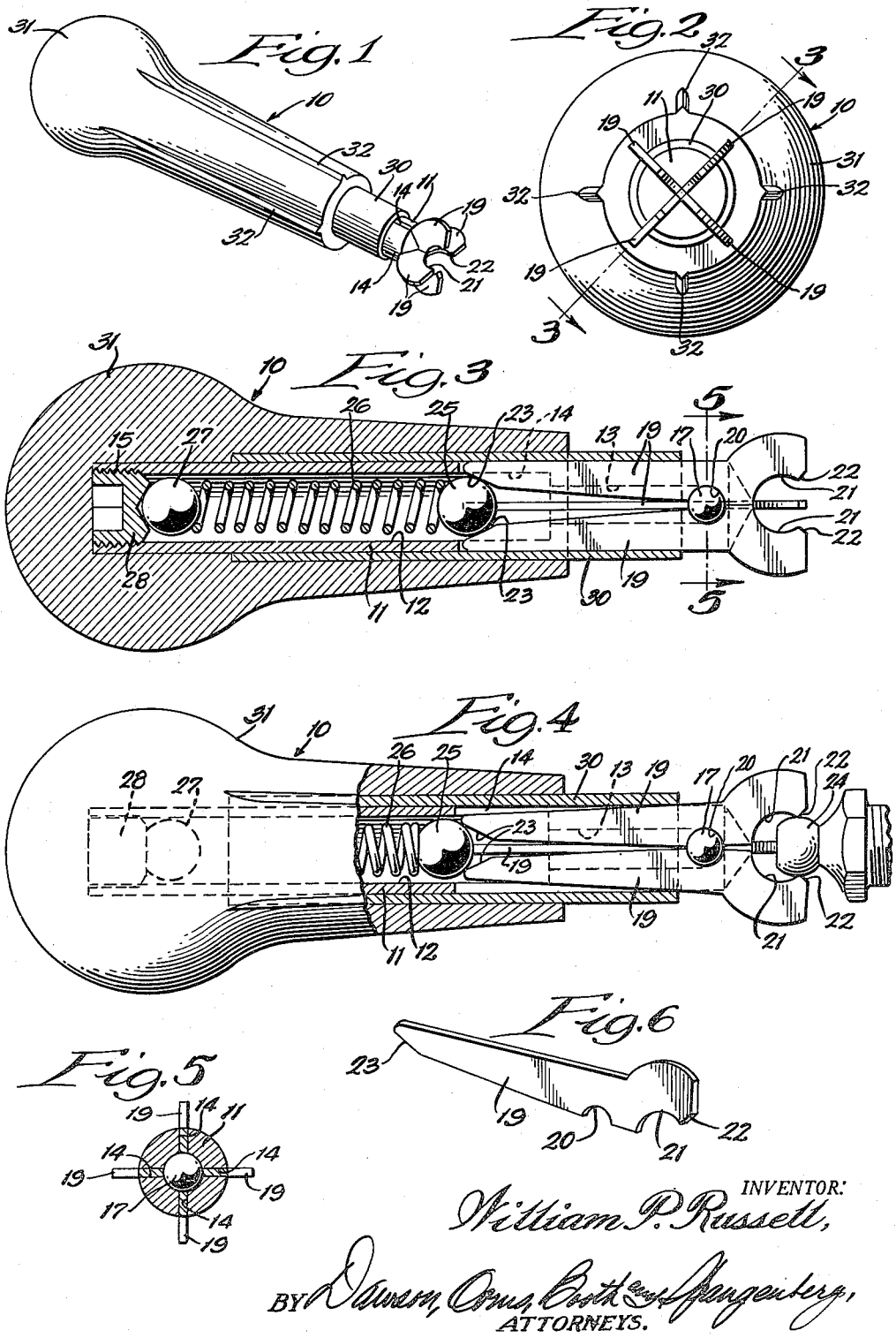
INVENTOR:
William P. Russell,
BY Dawson, Ong, Booth and Spangenberg,
ATTORNEYS.

Patented Apr. 22, 1952

2,593,799

UNITED STATES PATENT OFFICE 2,593,799

TOOL FOR CLEANING GREASE FITTINGS

William P. Russell, La Grange, Ill., assignor to John R. Ford, La Grange Park, Ill.

Application April 21, 1949, Serial No. 88,815

3 Claims. (Cl. 15—236)

1

This invention is directed to a cleaning tool for grease fittings.

Grease fittings, particularly those on automobiles, trucks, farm machinery and the like, quite often become so encrusted with dirt and hard grease that it is practically impossible to apply a grease gun to the grease fitting for lubrication purposes. Under these conditions, either considerable time is spent in removing the dirt from the grease fittings with an unsuitable tool such as a screw driver or the like before greasing, or the fitting is left ungreased following a perfunctory attempt at dirt removal.

The principal object of this invention is to provide a grease fitting cleaner which is small and compact so that it may be conveniently carried and readily used, which is easily manipulated, which cuts through the crusted dirt and rapidly cleans the fitting, which is readily applied to and removed from the fitting, which is efficient in operation and rugged in construction and which is inexpensively manufactured.

The grease fitting cleaner preferably includes a plurality of elongated cleaning blades which are longitudinally and radially arranged in a supporting member. The blades are provided at one end with facing cleaning edges adapted to be forced over a grease fitting for cleaning the same. The blades supported in the supporting member have their cleaning edges exposed and the cleaning edges are resiliently urged radially toward each other for firmly contacting and hence thoroughly cleaning the grease fitting. Thus, when the cleaning tool is applied to the grease fitting and rotated, the grease fitting is effectively cleaned.

Other objects of this invention reside in the details of construction of the grease fitting cleaner and the cooperative relationship between the component parts thereof.

Other objects and advantages will become apparent to those skilled in the art upon reference to the accompanying specification, claims and drawing in which:

Figure 1 is a perspective view of the grease fitting cleaner of this invention;

Figure 2 is an enlarged elevational view looking from the right in Fig. 1;

Figure 3 is a sectional view taken substantially along the line 3—3 of Fig. 2;

2

Figure 4 is a view similar to Fig. 3 but showing the grease fitting cleaner being applied to a grease fitting;

Figure 5 is a sectional view taken substantially along the line 5—5 of Figure 3; and Figure 6 is a perspective view of one of the blades.

The grease fitting cleaning tool of this invention is generally designated at 10. It includes a tubular supporting member 11 provided with an internal bore 12 having a communicating smaller bore 13 terminating in a seat for a ball. The supporting member at one end is provided with a plurality of radial slots 14, four in number as shown. These radial slots extend from the exterior of the supporting member 11 to the interior thereof. The other end of the supporting member 11 is provided with internal screw threads 15.

A ball 17 is adapted to be received by the ball seat at the end of the reduced bore 13 and operates as a fulcrum or pivot point for the plurality of cleaning blades.

The cleaning blades are designated at 19 and are elongated and longitudinally and radially arranged in the slots 14 of the supporting member 11. Each cleaning blade is provided intermediate its end with a recess 20 for receiving the ball 17 so that the cleaning blades are pivotally mounted to rock on the ball in the radial slots 14 of the supporting member. The cleaning blades extend outwardly beyond the end of the supporting member and the outer ends of the blades are provided with cleaning edges 21 which face each other and which correspond to the contour of the grease fitting to be cleaned. The ends of the blades adjacent the work engaging edges 21 are provided with cam edges 22 to assist in forcing the blades over the grease fitting. The other ends of the blades 19 are provided with cam surfaces 23.

A ball 25 is received in the bore 12 of the supporting member 11 and engages the cam surfaces 23 of the blades. The ball 25 is resiliently urged against the cam surfaces 23 by a spring 26, one end of which engages the ball 25 and the other end of which engages a ball 27 held in place in the supporting member 11 by a plug 28 engaging the internal screw threads 15 of the supporting member 11. Thus, the spring 26 urges the ball 25 forwardly and the ball 25 in turn operates on the cam surfaces 23 resiliently to spread the same and hence resiliently to urge the cleaning edges 21 of the blades radially toward each other. The spring pressed ball 25 also urges the blades and fulcrum ball 17, as a unit, outwardly of the tubular support 11 as far as permitted by the seat which is provided for the slidable fulcrum at the small bore end of the tubular supporting member.

A sleeve 30 encompasses the greater portion of the supporting member 11 and overlies the slots 14 therein. The sleeve 30 therefore operates to maintain the blades in place in the supporting member, and also, operates to limit the spreading action of the blades by the resiliently pressed ball 25. The sleeve 30 is suitably secured to the supporting member 11 and has a handle member 31 suitably secured to it. The handle member 31 provides a convenient handle for grasping the cleaning tool and for rotating the same. In this latter connection the handle member 31 is preferably provided with ridges 32 to assist in the rotating of the tool.

As will be seen in Fig. 3 the ball 17 operates to pivotally mount the blades 19 within the supporting member 11 and the spring pressed ball 25 operates to urge the cleaning edges 21 of the blades toward each other and also to shift the blade longitudinally outwardly of the handle as far as permitted by the seat for the fulcrum ball 17. The sleeve 30 operates as a stop for the resilient force of the ball 25.

When the cleaning tool is to be applied to a grease fitting such as the grease fitting 24 illustrated in Fig. 4, it is pressed endwise against the fitting. The cam edges 22 operating in conjunction with the fitting 24 operate to spread the outer ends of the blades 19 against the action of the spring pressed ball 25. When this is done the spring pressed ball 25 is urged rearwardly against the action of the spring 26 by the cam surfaces 23 as illustrated in Fig. 4 to allow the blades to be forced over the fitting 24. When the tool is inserted over the fitting 24 the spring pressed ball 25 operates on the cam surfaces 23 resiliently to force the cutting edges 21 tightly against the fitting 24. The tool is then rotated and the blades operate to clean thoroughly the fitting 24.

When it is desired to remove the tool from the fitting it is merely pulled therefrom. Such a disengagement is permitted by the spreading of the outer ends of the blades against the resilient action of the spring pressed ball 25.

The cleaning tool of this invention may be provided with any desired cleaning edges for the purpose of adapting it to any desired grease fitting. The cleaning edges as illustrated are substantially circular so that they conform to a grease fitting of the spherical type.

The grease fitting cleaner tool of this invention is small and compact and may be conveniently carried in a pocket so that it is readily available for cleaning purposes. Thus it may be readily used. It is easily applied to and taken off a grease fitting and is easily manipulated for cleaning purposes. The blades cut through crusted dirt on the grease fitting and rapidly clean the grease fitting upon rotation of the tool. The tool is held firmly on the fitting so that thorough cleaning of the fitting is assured. The tool is rugged in construction, and yet, the same may be inexpensively manufactured.

While for purposes of illustration, one form of this invention has been disclosed, other forms may become apparent to those skilled in the art upon reference to this disclosure, and therefore, this invention is to be limited only by the scope of the appended claims.

I claim:

1. A grease fitting cleaner comprising a plurality of elongated cleaning blades longitudinally and radially arranged and having cam surfaces at one end and at the opposite end facing cleaning edges adapted to be forced over a grease fitting for cleaning the same and having facing recesses intermediate the ends thereof, an elongated supporting member tubular in one end portion and provided in its opposite end portion with a plurality of longitudinally extending radial slots each for receiving and laterally supporting one of the blades, a seat in the slotted end portion of the supporting member near the outer end portion thereof, a ball engaging the seat and also the recesses of the blades for pivotally mounting the blades in the supporting member with the cleaning edges exposed, and a spring pressed means in the tubular end portion of the supporting member in engagement with the cam surfaces of the blades for resiliently urging the cleaning edges toward each other.

2. A grease fitting cleaning tool comprising an elongated support formed in one end portion with a plurality of longitudinally extending radial slots and with a ball seat coaxially thereof, an elongated cleaning blade slidably positioned within each slot for lateral support therein, and projected outwardly beyond one end of the support for cleaning engagement with a grease fitting in cooperation with the remaining blades, and formed intermediately of its ends with a radial recess, the opposite end of each blade being positioned inwardly of the support and formed into a cam, a ball engaging the seat at a point radially intermediate of the several blades and in engagement with the recesses thereof to provide a fulcrum therefor and movable away from its seat further inwardly of the support, together with the blades fulcrumed thereon, and means adjacent the inner ends of the blades in coaction with the cams thereof acting to rock the blades radially upon the ball fulcrum in response to inward sliding movement of the blades.

3. A grease fitting cleaner comprising a plurality of elongated blades radially arranged and provided at one end with work engaging faces, an elongated support having an outer end portion wherein is formed a plurality of elongated radial slots each receiving and laterally supporting one of the blades with its work engaging end extended beyond the proximate end of the support, a common fulcrum for all the blades slidably positioned within the elongated support in its radially slotted end portion, interengaging means on the fulcrum and each blade intermediately of its ends to maintain the latter in a fixed longitudinal position relative thereto, resilient means within the support inwardly beyond the blades in engagement with the proximate end portion thereof for urging the blades endwise of the support toward its outer end, means within the support providing a stop for the fulcrum to limit outward movement thereof and of the blades supported thereby, and coacting surfaces on the resilient means and blades at the point of engagement therebetween for imparting a radial outward rocking movement to the blades whereby to urge the work-engaging faces at the opposite blade ends radially toward each other.

WILLIAM P. RUSSELL.

REFERENCES CITED

The following references are of record in the file of this patent:

UNITED STATES PATENTS

| Number | Name | Date |
|---|---|---|
| 184,615 | Hardy | Nov. 21, 1876 |
| 570,181 | McGill | Oct. 27, 1896 |
| 837,225 | Holman | Nov. 27, 1906 |
| 966,105 | Lavigne | Aug. 2, 1910 |
| 1,243,860 | Olson et al. | Oct. 23, 1917 |
| 1,481,259 | Harrison | Jan. 22, 1924 |
| 1,954,444 | Early | Apr. 10, 1934 |
| 2,005,359 | Bagnoli et al. | June 18, 1935 |
| 2,204,516 | Stone | June 11, 1940 |
| 2,254,681 | Honchock | Sept. 2, 1941 |
| 2,460,414 | Fuller | Feb. 1, 1949 |
| 2,479,796 | Warzynski | Aug. 23, 1949 |

FOREIGN PATENTS

| Number | Country | Date |
|---|---|---|
| 19,308 | Australia | Sept. 12, 1935 |
| 380,160 | Germany | Dec. 7, 1922 |
| 594,953 | France | July 6, 1925 |
| 855,686 | France | Feb. 19, 1940 |